J. W. MILLER.
JOINT FITTING FOR TRUSS STRUCTURES.
APPLICATION FILED JULY 3, 1918.

1,284,919. Patented Nov. 12, 1918.

Inventor
John W. Miller.
By Henry L. Reynolds

Witness

UNITED STATES PATENT OFFICE.

JOHN W. MILLER, OF SEATTLE, WASHINGTON, ASSIGNOR TO BOEING AIRPLANE COMPANY, OF SEATTLE, WASHINGTON, A CORPORATION OF WASHINGTON.

JOINT-FITTING FOR TRUSS STRUCTURES.

1,284,919.   Specification of Letters Patent.   Patented Nov. 12, 1918.

Application filed July 3, 1918. Serial No. 242,209.

*To all whom it may concern:*

Be it known that I, JOHN W. MILLER, a citizen of the United States, and resident of the city of Seattle, county of King, and State of Washington, have invented certain new and useful Improvements in Joint-Fittings for Truss Structures, of which the following is a specification.

My invention relates to a fitting which is intended for use in connecting up the various members of a trussed structure, as for instance the fuselage of an aeroplane. The object of my invention is to provide a fitting for such joints which shall be light in weight, strong, and which provides means for attachment of the tension members of the trussed structure as well as means for efficiently taking care of the compression strains from the thrust members of the trussed structure.

The features of my invention which I consider to be novel and upon which I desire a patent will be described, and then particularly defined in the claims. The accompanying drawings show the type of construction which I now prefer to use.

Figs. 1 and 3 are in each case views taken of the fitting as shown in Fig. 2 from the direction in which said Figs. 1 and 3 are located. This fitting is designed for use in such locations where a longitudinal member has two thrust members joining the same at approximately right angles thereto and at which point it is also desired to secure tension members.

Figure 1:
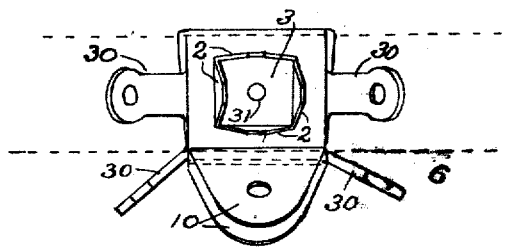
Figure 1 shows a face view of the fitting, looking in a direction substantially parallel with the axis of one of the longitudinal members of the trussed structure.
Figure 2:
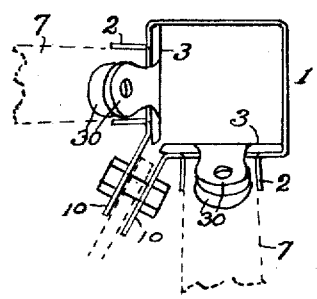
Fig. 2 is an edge view looking in a direction substantially perpendicular to the axis of the member about which the clip is placed.
Figure 3:
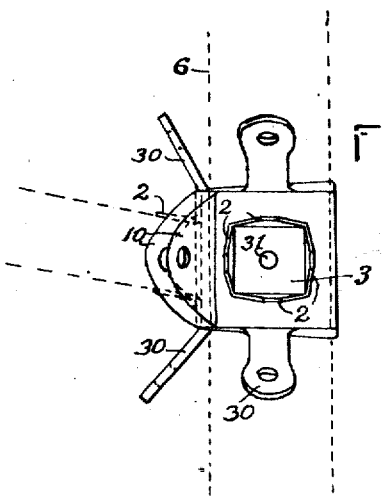
Fig. 3 is a face view of the fixture, the line of view being substantially parallel with the second thrust member which it is designed to accommodate.

The fitting is composed of essentially three stampings which are preferably integrally joined together so as to form a single completed member. The base of this fitting consists of a plate, 1, which is bent about one of the bars of a trussed structure. As herein shown this bar is of a square cross section. The ends of this encircling plate or bar, 1, terminate in two ears, 10, preferably at one corner of the square formed by the trussed bar, 6.

At the side of the fitting where it is desired to join a thrust member, as bar 7, the plate from which the encircling band, 1, is made, has four ears. 2. of a general triangular shape, stamped therefrom and pressed outwardly, thus forming a socket for the reception of the ends of the thrust bars, 7.

It has been found that if the thrust bars, 7, are permitted to bear directly upon the longitudinal bar, 6, which bars in the construction of fuselages of aeroplanes are generally made of wood, the end grain of the thrust bars, 7, has a tendency to compress and seat itself into the side grain of the longitudinal bar, 6. It is, therefore, desirable, if not necessary, to provide something of the nature of a washer or thrust plate, between the ends of the bars, 7, and the bar, 6. It is also desirable to provide a fitting of this character with means for securing tension members, as wires, thereto. I accomplish both of these results by the following means:

I secure a plate as 3 to the inner surface of these sides of the fitting, this being preferably secured by spot welding, or brazing, or by both. This closes the hole which has been made in the band, 1, by stamping out the ears, 2, and thus furnishes a surface against which the ends of bars, 7, may bear and thus prevents their injuring the bar, 6, about which the fitting is placed. This plate is also provided with a hole 31, centrally positioned in the socket for the reception of a screw which enters the bar or strut 10 seated in said socket, thus securing it against being pulled outward.

These plates, 3, are also provided with ears, 30, extending beyond the edges of the strap, 1, and each provided with a hole so that tension members may be connected therewith. In the fitting as shown in the drawings, provision has been made for seating two of the thrust members, 7, upon two adjacent sides of the fitting. It is evident that the same provision might be made at the other sides, if, for any reason, this should be necessary.

The use of the plates, 3, in the manner described provides four places for the attachment of the tension rods. A fifth place is provided by the two ears, 10, which form the ends of the strap, 1, by which the fitting is securely bound upon the bar, 6.

A fitting of this type being made from sheet steel, may be very strong for its weight. It is also of a material which is of reliable and dependable character, not likely to contain flaws which will result in breakage in use. It can also be cheaply made and has many points of superiority over any cast fitting.

What I claim as my invention is:

1. A joint fitting for truss structures comprising a band shaped to fit about a bar and having ears cut therefrom and bent outward to form receiving sockets for struts, and thrust plates secured to the inner surface of said band to cover said sockets.

2. A joint fitting for truss structures comprising a band shaped to fit about a bar and having ears cut therefrom and bent outward to form receiving sockets for struts, and a plate secured to the inner surface of the band to cover and form a bottom for said socket, said plates having ears projecting from beneath the band and adapted to form a connection for a truss member.

3. A joint fitting for truss structures comprising a band bent to fit about a beam of the truss and having ears cut therein and bent outward to form a socket for a strut and a bearing plate secured to the inner surface of said band to cover the socket and having a screw receiving hole within the socket.

Signed at Seattle, Washington, this 27th day of June, 1918.

JOHN W. MILLER.